P. HAWKSWORTH.
SAFETY DEVICE FOR MOTOR VEHICLES.
APPLICATION FILED OCT. 22, 1913.
1,127,241. Patented Feb. 2, 1915.
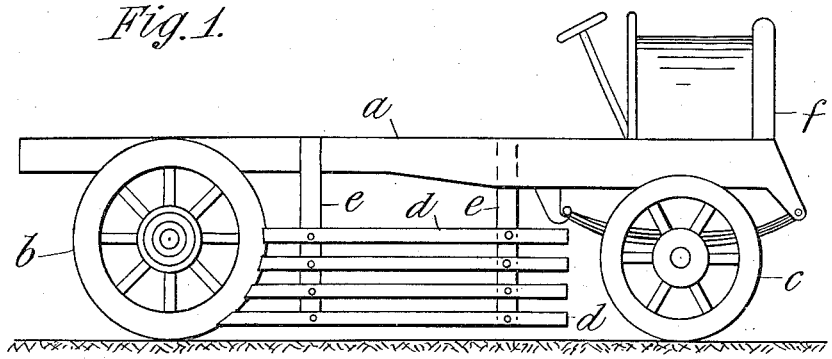
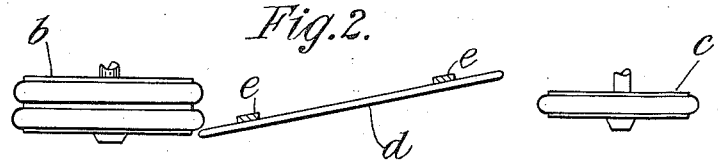
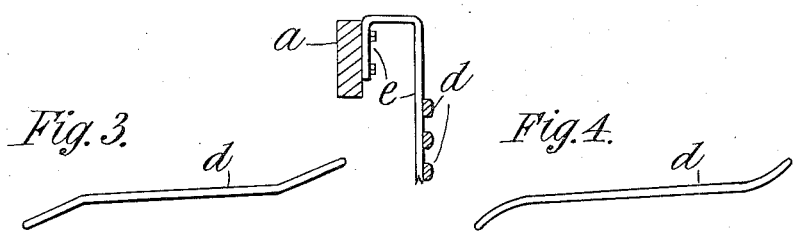
Witnesses
Inventor
Percy Hawksworth
by James L. Norris
Attorney

UNITED STATES PATENT OFFICE.

PERCY HAWKSWORTH, OF EARLSFIELD, ENGLAND, ASSIGNOR TO CHARLES BARNARD BURDON, OF LONDON, ENGLAND.

SAFETY DEVICE FOR MOTOR-VEHICLES.

1,127,241.  Specification of Letters Patent. Patented Feb. 2, 1915.

Application filed October 22, 1913. Serial No. 796,702.

*To all whom it may concern:*

Be it known that I, PERCY HAWKSWORTH, a subject of the King of Great Britain, residing at 43ª Penwith road, Earlsfield, in the county of Surrey, England, have invented certain new and useful Improvements in or Relating to Safety Devices for Motor-Vehicles, of which the following is a specification.

This invention has reference to safety devices for motor vehicles. It is well known that many, if not most, of the worst accidents with motor busses or heavy motor vehicles are caused by the rear wheels.

Now according to this invention, which is intended more particularly for use on motor busses and like heavy vehicles, a catcher or fender is provided for each of the rear wheels, consisting of a frame carried at each side of the bus or vehicle in such a way that with only a slight inclination its rear end overlaps, or extends to the outside of the rear wheels, or is approximately level with the outer edge thereof. The guard or frame thus serves to push anyone who may have been knocked down, or otherwise comes against it, clear of the said rear wheels. The slats of the guard or frame are preferably made of wood and can thus be easily repaired or replaced by new ones if desired.

In order that the invention may be clearly understood and readily carried into effect, reference will now be had to the accompanying diagrammatic drawings, in which:—

Figure 1 shows by way of example a side view of a slat-frame guard arrangement, such as referred to. Fig. 2 is a part plan thereof, showing how the flat frame is inclined, instead of being parallel to the side of the bus. Figs. 3 and 4 show in plan view, guard frames of slightly different shapes. Fig. 5 is a fragmentary detail view hereinafter referred to.

*a* represents a part of the under frame or chassis of a bus or other motor vehicle, *b* being the rear wheels, and *c* the front wheels thereof.

*d d* are slats or rods preferably of wood, which form the rear-wheel guard or fender. As shown, this is carried by vertical rods or brackets *e* secured to any convenient part of the under frame *a*. The slats or rods *d* may be half-round, or have their edges removed, and are simply secured directly to the carrier rods or brackets *e*, it may be by bolts and nuts or otherwise. The lowest slat may advantageously be about 3 or 4 inches from the ground. There may be any desired number of these slats and they may be carried higher up than shown in Fig. 1. The topmost ones may also be shorter and bent or curved inward toward the frame at their front ends and the lower ones may be similarly curved. The outer surfaces of the slats should be kept as smooth as possible and free from projections which might catch anyone who came against them.

The guard or fender frame is slightly inclined relatively to the side of the bus, approximately as shown in the plan view (Fig. 2) so that it lies across the path of the rear wheel with its rear edge about level with the outer edge of said rear wheel or just a little outside the said rear wheel, its forward edge lying as shown inside the path of the front wheels, so that the frames at each side of the vehicle converge toward each other as it were. In this way, if anyone should for instance be knocked down by the bonnet or front *f* of the bus or other vehicle, and the driver has succeeded in clearing him with the front wheels, he will be pushed to one side by the advance of the inclined guard frame clear of the rear wheels, instead of being caught by the latter, as frequently happens. Similarly, if anyone should be accidentally thrown toward the bus from the side, as for instance by a side-slip from a bicycle, the inclined fender will act in the same way and prevent him going under the bus or vehicle and from being run over by the rear wheels.

By the arrangement above described, a very simple, efficient and reliable protection is provided against accidents from the rear wheels of motor vehicles and the device also acts as a side-guard, to close in and protect the side-space between the front and rear wheels. The slats may gradually increase in length toward the bottom to allow for the curvature of the rear wheels. The rear edge of the frame may however be plain and vertical if desired.

Obviously, instead of being all in one straight piece, the guard frame might be made with its ends inclined more than the body part as shown in plan in Fig. 3, or the said ends might be curved or bent as shown in Fig. 4. Also instead of being formed of slats, the guard frame may be formed of other convenient materials, such as boards for instance. The brackets *e* may (see Fig. 5) be bent outward or elbow-shaped at the top if necessary or be of any convenient shape to carry the guard frame securely at the desired angle or distance from the underframe *a*. There may be three or four brackets at intervals, instead of only two as shown. The said brackets or rods *e* may be combined with spring devices, or be made in two parts connected by a telescopic or sliding spring joint, so that if the bottom of the frame should strike the ground (for instance owing to the jolting of the vehicle) it will yield sufficiently to prevent damage. Also small round-edged rollers or casters may be fitted at the bottom of the frame, for instance at the lower ends of the rods *e* to assist in passing over obstructions.

What I claim as my invention and desire to secure by Letters Patent of the United States is:—

1. In a motor vehicle, the combination, with the rear wheels, of a guard extending along each side of the vehicle from a point near the outer edge of the rear wheel to a point inside the path of the front wheel, substantially as described.

2. In a motor vehicle, the combination, with the rear wheels, of inclined guards in advance of said wheels, extending along the sides of the vehicle, which guards exert a wedge-like action so that anyone coming against them will be pushed sidewise clear of the said wheels.

3. In a motor vehicle, the combination, with the rear wheels, of a slightly inclined and stationary guard frame extending along each side of the vehicle and reaching nearly to the ground level, the rear part of said frame crossing the path of the adjacent rear wheels, while its front part lies inside the path of the adjacent front wheel, substantially as described.

4. In a dirigible motor vehicle, the combination, with the rear wheels, of a stationary and slightly inclined guard frame in front of each rear wheel extending along each side of the vehicle nearly to the adjacent front wheel, the front edges of the frames being so placed that they will miss any person who has not been struck by the front wheels, substantially as described.

5. In a dirigible motor vehicle, the combination, with the rear wheels, of inclined side guards whose outer and rear edges lie near the outer edges of said rear wheels, and brackets rigidly secured to the frame of the vehicle near the top of the guards for holding said guards permanently in position with their rear parts crossing the paths of the rear wheels, so that they exert an outward wedging or pushing action on anything striking against them, substantially as described.

6. In a dirigible motor vehicle, the combination, with the rear wheels, of fixed side guards inclined slightly across the paths of said rear wheels, and brackets for supporting said guards from the frame of the vehicle so that the front ends of said guards lie close behind the front wheels and inside and clear of the paths thereof, in such a way that said guard ends will clear anyone that the front wheels have avoided, substantially as described.

7. In a dirigible motor vehicle, the combination of fixed side guards extending near to the ground level along both sides of the vehicle at a slight angle, said guards having curved front ends which converge behind the front wheels, and rear ends which extend across the paths of the rear wheels and terminate approximately level with the outer edges of said wheels, substantially as described.

In testimony whereof I affix my signature in presence of two witnesses.

PERCY HAWKSWORTH.

Witnesses:
H. D. JAMESON,
O. J. WORTH.